United States Patent
Rouphael

(10) Patent No.: US 7,516,618 B2
(45) Date of Patent: Apr. 14, 2009

(54) ENGINE AIR SUPPLY CONTROL METHOD WHICH IS INTENDED, FOR EXAMPLE, FOR THE CONTROL OF A TURBOCHARGED ENGINE

(75) Inventor: Roger Rouphael, L'Union (FR)

(73) Assignee: Continental Automotive France, Toulouse (FR)

(*) Notice: Subject to any disclaimer, the term of this patent is extended or adjusted under 35 U.S.C. 154(b) by 0 days.

(21) Appl. No.: 10/575,162

(22) PCT Filed: Aug. 18, 2004

(86) PCT No.: PCT/EP2004/009237

§ 371 (c)(1),
(2), (4) Date: May 24, 2006

(87) PCT Pub. No.: WO2005/033494

PCT Pub. Date: Apr. 14, 2005

(65) Prior Publication Data

US 2006/0277908 A1    Dec. 14, 2006

(30) Foreign Application Priority Data

Oct. 8, 2003    (FR) .................................. 03 11741

(51) Int. Cl.
*F02B 33/44* (2006.01)

(52) U.S. Cl. .................. 60/605.1; 60/602; 123/672; 123/676; 123/677; 123/679

(58) Field of Classification Search ............... 60/605.1, 60/602; 123/672, 676, 677, 679, 687, 689
See application file for complete search history.

(56) References Cited

U.S. PATENT DOCUMENTS

| | | | |
|---|---|---|---|
| 5,377,112 A | 12/1994 | Brown et al. | |
| 5,738,126 A * | 4/1998 | Fausten | 123/568.21 |
| 6,035,640 A * | 3/2000 | Kolmanovsky et al. | 60/605.2 |
| 6,067,800 A * | 5/2000 | Kolmanovsky et al. | 60/602 |
| 6,508,241 B2 * | 1/2003 | Miller et al. | 123/672 |
| 6,915,788 B2 * | 7/2005 | Nakamura | 123/488 |
| 7,107,140 B2 * | 9/2006 | Yoshino et al. | 701/102 |
| 7,117,078 B1 * | 10/2006 | Gangopadhyay | 701/103 |
| 2002/0100467 A1 * | 8/2002 | Jaliwala et al. | 123/676 |
| 2003/0004677 A1 | 1/2003 | Olin | |
| 2003/0010019 A1 | 1/2003 | Engel et al. | |
| 2007/0125083 A1 * | 6/2007 | Rollinger et al. | 60/605.1 |

FOREIGN PATENT DOCUMENTS

| | | |
|---|---|---|
| EP | 1 347 163 | 9/2003 |
| FR | 2 824 596 | 11/2002 |

* cited by examiner

*Primary Examiner*—Thomas Denion
*Assistant Examiner*—Douglas J. Duff
(74) *Attorney, Agent, or Firm*—Young & Thompson

(57) ABSTRACT

An engine air supply control method relating to a turbocharged engine including an intake manifold (20) which is disposed downstream of the compressor of the turbocharger (14) and an exhaust manifold (22) which is disposed upstream of the turbine of the turbocharger (14). The method includes determining the mass air flow supplying the engine and/or the pressure in the intake manifold (20) and the temperature in the exhaust manifold. The pressure in the exhaust manifold (22) is determined as a function of the pressure in the intake manifold (20), the engine speed, the temperatures in the cylinders (4) and in the exhaust manifold (22), the pressure in the intake manifold (20) being optionally determined from the mass air flow. Inversely, the pressure in the intake manifold.

14 Claims, 1 Drawing Sheet

Figure 1:
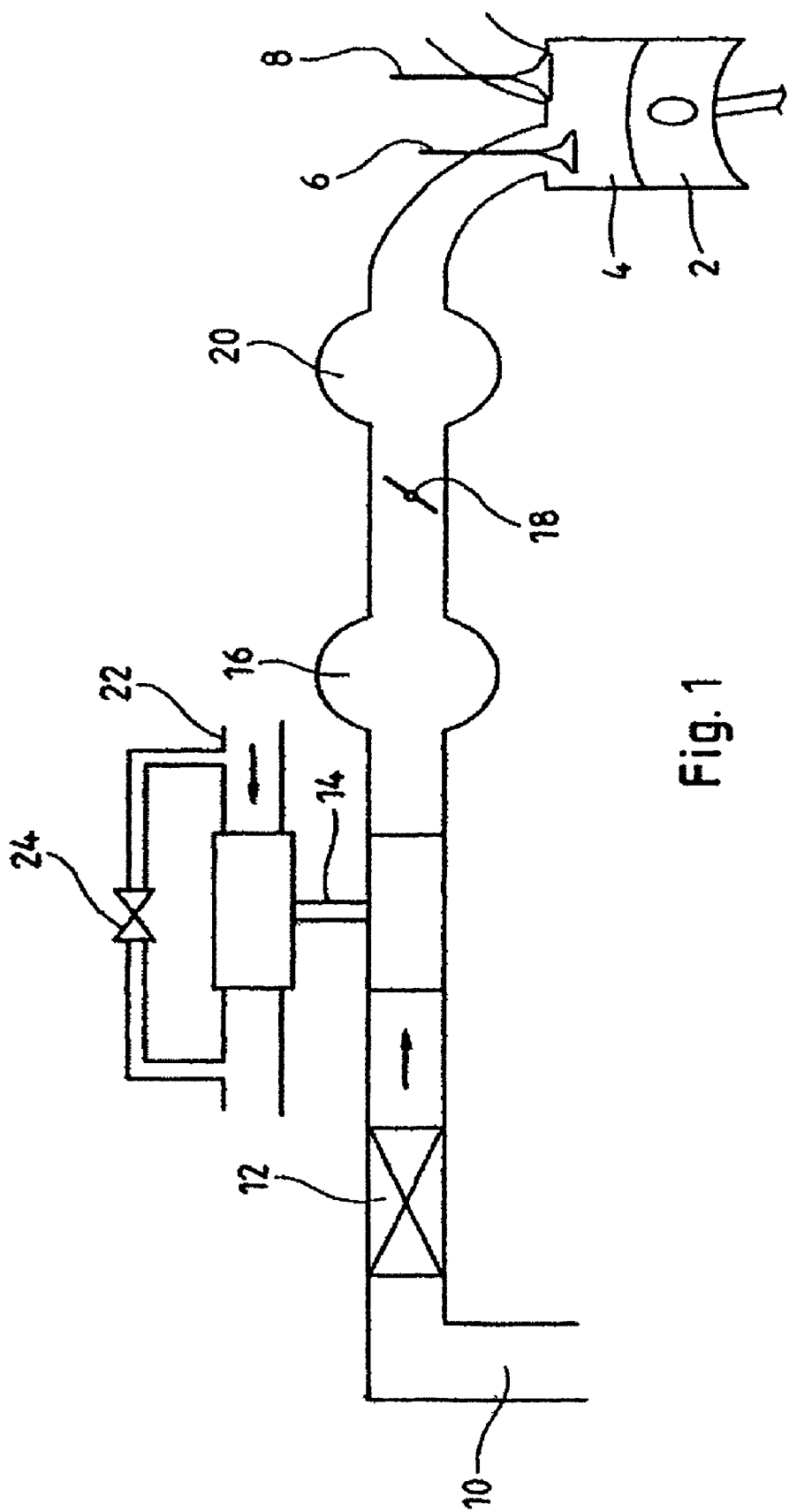

ENGINE AIR SUPPLY CONTROL METHOD WHICH IS INTENDED, FOR EXAMPLE, FOR THE CONTROL OF A TURBOCHARGED ENGINE

BACKGROUND OF THE INVENTION

1. Field of the Invention

The present invention relates to an engine air supply control method, intended for example for the control of a turbocharged engine and more particularly for an engine of this kind intended for a private automobile.

2. Description of the Related Art

Generally, the air supply in an engine is controlled by measuring the mass air flow through the engine. There are many methods of determining this mass flow. For example, there is a known way of measuring the speed and temperature of the air in a known section of the air supply system, for example at the throttle valve controlling the air flow into the engine. Such a measurement is carried out, for example, in racing vehicles and motorcycles. Another method of determining this flow consists in measuring the pressure in the intake manifold, the engine speed and the air temperature. This method is used in motor vehicles at the present time. For top-range vehicles, this flow is sometimes also measured by means of a wire which is heated and through which an electric current is passed, the resistance of the wire being measured by means of a Wheatstone bridge. All these measurement methods are known to those skilled in the art and are not detailed here.

In a turbocharged engine, and particularly in such an engine fitted with an electric throttle valve, the importance of measuring the exhaust pressure for the determination of the loss of torque is apparent, more particularly in relatively low-capacity engines. This is because a request from the driver via the accelerator pedal can be interpreted as the request for a given torque. It is then desirable to determine the torque of the engine, and therefore also the losses of torque within the engine due, for example, to friction and back pressure, in order to be able to respond to this request. The exhaust pressure is then a factor to be taken into account for the determination of the losses of torque within the engine.

SUMMARY OF THE INVENTION

The object of the present invention is therefore to provide an engine air supply control method which enables the exhaust pressure to be taken into account to make it possible, for example, to determine the loss of torque of the engine, preferably without increasing the production cost of the exhaust pressure control system by the addition of a pressure sensor. Another object of the invention can also be to control the engine air supply system on the basis of the exhaust pressure and temperature.

For this purpose, it proposes an air supply control method for a turbocharged engine having an intake manifold downstream of the compressor of the turbocharger and an exhaust manifold upstream of the turbine of the turbocharger, in which the mass air flow supplied to the engine and/or the pressure in the intake manifold are determined, together with the temperature in the exhaust manifold.

According to the present invention, the pressure in the exhaust manifold is determined as a function of the pressure in the intake manifold, the engine speed, and the temperatures in the cylinders and in the exhaust manifold, the pressure in the intake manifold being determined if necessary on the basis of the mass air flow and vice versa.

For greater accuracy in the calculation of the exhaust pressure, a correction factor dependent on the ambient surrounding pressure is preferably provided. In this case, the pressure in the exhaust manifold $P_{exh}$ is calculated, for example, by a formula of the type:

$$P_{exh}=[A(T_c)*MAP-B(N, AMP, T_{exh})]/C(T_{exh})$$

where A, B and C are predetermined functions, $T_c$ is the temperature in the cylinders, MAP is the pressure in the intake manifold, N is the engine speed, AMP is the ambient pressure and $T_{exh}$ is the temperature of the burnt gases in the exhaust manifold.

In such a method, when the air flow supplied to the engine is regulated by means of a throttle valve and when this throttle valve is near its closed position within predetermined limits during a specified time interval, then the ambient external pressure AMP can advantageously be calculated on the basis of the exhaust pressure as a function of the engine speed.

The present invention also proposes an air supply control method for a turbocharged engine having an intake manifold downstream of the compressor of the turbocharger and an exhaust manifold upstream of the turbine of the turbocharger, in which the mass air flow supplied to the engine and/or the pressure in the intake manifold are determined, together with the temperature in the exhaust manifold.

According to the invention, the pressure in the exhaust manifold is measured by means of a sensor or the like, and the pressure in the intake manifold is determined on the basis of the exhaust pressure measured as a function of the engine speed, the temperatures in the cylinders and in the exhaust manifold, the mass air flow being determined if necessary on the basis of the pressure in the intake manifold.

In this method, a correction factor dependent on the ambient surrounding pressure is advantageously provided. In this case, the pressure in the intake manifold MAP is calculated, for example, by a formula of the type:

$$MAP=[F(N, T_{exh})*P_{exh}+G(N, AMP, T_{exh})]/[H(N, T_c)],$$

where F, G and H are predetermined functions, $T_c$ is the temperature in the cylinders, $P_{exh}$ is the pressure in the exhaust manifold, N is the engine speed, AMP is the ambient pressure and $T_{exh}$ is the temperature of the burnt gases in the exhaust manifold.

In a method according to the invention, the temperature in the exhaust manifold is advantageously determined on the basis of modeling. There are existing modeling methods of this kind, for example for the protection of the turbocharger against overheating. They make it possible to dispense with the use of a sensor which would be subject to severe conditions of use, since the temperature variations in the exhaust manifold are large and the temperatures are very high when the engine is running.

BRIEF DESCRIPTION OF THE DRAWING FIGURES

Details and advantages of the present invention will be made clearer by the following description, provided with reference to the attached schematic drawing, in which:

FIG. 1. shows in a schematic way an air supply system for a turbocharged engine.

DETAILED DESCRIPTION OF THE PREFERRED EMBODIMENTS

A piston 2, which can move in a cylinder 4, is visible on the right-hand side of this single figure, downstream of the illustrated supply system. A valve 6 controls the admission of air into the cylinder 4. Another valve 8 is provided for the discharge of the burnt gases from the cylinder 4. The corresponding engine has, for example, a plurality of cylinders, and the supply system illustrated is common to all the cylinders or to some of them.

This air supply system incorporates, from upstream to downstream, an air intake 10, a mass air flow meter 12, a turbocharger 14, a chamber known as an intercooler 16, a throttle valve 18 which is positioned in a pipe into which passes the air supplied to the cylinders, and which enables the air flow cross section of this pipe to be adjusted, together with an intake manifold 20. Each of the intake valves 6 is directly linked to the intake manifold 20.

Downstream of the cylinders 4, the burnt gases, that is to say the exhaust gases, leaving through the exhaust valves 8 enter an exhaust manifold 22. This consists of a nozzle collecting the exhaust gases before discharging them, after treatment, to the atmosphere. In the present case of a turbocharged engine, the exhaust manifold 22 collects the burnt gases and directs them towards the turbine of the turbocharger 14. Downstream of this, the exhaust gases flow into a catalytic converter and a silencer (not shown) before they are discharged.

The turbocharger 14 has two turbines interconnected by a shaft. A first turbine is positioned after the exhaust manifold 22 and is rotated by the burnt gases which leave the cylinders 4 through the exhaust valves 8 and which are guided by the exhaust manifold 22. The second turbine, called the compressor, is positioned, as mentioned above, in the engine air supply system, and pressurizes the air located in the intercooler 16. In a conventional way, a turbocharger discharge valve 24 makes it possible to "short-circuit" the turbine located downstream of the exhaust manifold 22.

This kind of structure is normal in turbocharged engines. The present invention relates to an engine equipped with an intake system of this type in which the position of the throttle valve 18 is controlled either mechanically or electrically. In the latter case, it is useful to regulate the angle of opening of the throttle valve 18 and the opening of the turbocharger discharge valve 24 simultaneously in order to control the air flow into the engine. It is then useful to control the engine in such a way that the driver's request, expressed by means of an accelerator pedal, is executed by the engine. The driver's request can be interpreted in terms of torque. In this case, a position of the accelerator pedal corresponds very approximately to a required torque. It is therefore useful to determine the parameters (opening of the throttle valve 18 and position of the turbocharger discharge valve 24) which enable the required torque to be obtained. The pressure in the exhaust manifold 22 can be used in this case to determine the torque of the engine, since this pressure can give rise to non-negligible losses of torque.

The exhaust pressure can be determined by a sensor which measures this value. This then increases the production cost of the engine, since no provision has been made hitherto for placing such a sensor in an engine.

The idea on which the present invention was based is that of being able to dispense with this sensor and determine the exhaust pressure by using the parameters already measured in an engine. Thus the present invention enables this pressure to be determined solely by using the sensors normally available in a turbocharged engine. It also makes it possible, in an engine equipped with an exhaust pressure sensor, to dispense with any other sensor, such as a sensor for determining the pressure in the intake manifold 20 or the mass air flow. In the case where two sensors are present, one for determining the exhaust pressure and the other the intake pressure, the invention permits operation in "degraded" mode, for example if there is a failure of the pressure sensor in the intake manifold, without any loss of information by comparison with a normal operation of the engine.

The originality of the invention consists in drawing a parallel between the areas upstream and downstream of the engine, in other words between the pressure in the intake manifold 20 and the exhaust pressure in the exhaust manifold 22. This parallel can be justified by explanations provided by calculation, as shown below.

It is assumed, by way of approximation, that the pressure in a cylinder 4 is constant during the filling phase of this cylinder 4. This pressure is then equal to the pressure in the intake manifold 20. This pressure is referred to below as MAP. Similarly, it is assumed that the temperature of the air filling the cylinder is constant, at $T_c$. It is also assumed that the intake valve 6 opens at the top dead center (TDC) of the piston 2 and closes at its bottom dead center (BDC).

Immediately before the fresh air intake phase, the cylinder 4 contains a quantity of burnt gases, and the pressure of these gases is Pb. The mass Bgm of the burnt gases in the cylinder 4 immediately before the opening of the valve 6 can then be found by the expression:

$$Bgm = V_{TDC} * Pb/R * T_{exh} \tag{a}$$

where $V_{TDC}$ is the volume of the cylinder when it is at the top dead center, $T_{exh}$ is the temperature of the burnt gases, and R is the perfect gas constant.

Similarly, the mass of gas Cgm contained in the cylinder 4 after the intake phase can be determined by the expression:

$$Cgm = V_{BDC} * MAP/R * T_c \tag{b}$$

where $V_{BDC}$ is the volume of the cylinder when it is at the bottom dead center.

In a cycle, the mass of gas Nam passing through a cylinder is therefore as follows:

$$Nam = Cgm - Bgm \tag{c}$$

The following equation is deduced from these three equations:

$$Nam = (V_{BDC} * MAP/R * T_c) - (V_{TDC} * Pb/R * T_{exh}) \tag{d}$$

Now let MafCyl be the mass of air flowing into a cylinder 4 per unit of time. This mass MafCyl depends on the engine speed N and on Nam, and is written in the following form:

$$MafCyl = f(N) * g(T_c) * MAP - h(N) * k(AMP) * l(T_{exh}) \tag{e}$$

f, g, h, k and l are functions which integrate the different variables of the preceding equations.

The variable AMP appears because the pressure Pb corresponding to the burnt gases is a value which is initially dependent on the intrinsic parameters of the engine and on the engine speed N, but also on the ambient external pressure.

It is also possible to determine MafCyl in a different way, by considering the burnt gases flowing out through the exhaust. Thus, by applying the perfect gas law, as for equations (a) and (b), we obtain:

$$MafCyl = ff(N) * ll(T_{exh}) * P_{exh} \tag{f}$$

where $P_{exh}$ is the pressure in the exhaust manifold.

Combining equations (e) and (f), we finally obtain:

$$MAP = [ff(N) * ll(T_{exh}) * P_{exh} + h(N) * k(AMP) * l(T_{exh})] / [f(N) * g(T_c)] \tag{g}$$

This formula therefore expresses a relation between the pressure in the intake manifold 20 and the pressure in the exhaust manifold 22. This relation makes use of the engine speed N, the exhaust temperature $T_{exh}$, and the ambient pressure AMP. All these parameters are determined by a sensor or by modeling in a known way in a turbocharged engine according to the prior art.

This formula (g) can thus be used to determine the pressure in the intake manifold 20, provided that an exhaust pressure sensor is available. This formula can also be inverted to find the exhaust pressure, using a sensor measuring the pressure in the intake manifold 20.

Surprisingly, in spite of the assumptions and approximations that were made, tests conducted to demonstrate that the calculated values accurately matched the measured values yielded excellent results. The correlation between the calculated value and the measured value is substantially greater than 0.9 according to the tests.

These tests also demonstrated that:

$$f(N)=ff(N) \tag{h}$$

A new function is then defined as follows:

$$hh(N)=h(N)/f(N) \tag{i}$$

Equation (g) then becomes equivalent to:

$$MAP=[ll(T_{exh})*P_{exh}+hh(N)*k(AMP)*l(T_{exh})]/g(T_c) \tag{j}$$

which is a simplified form of equation (g). This equation, when inverted to give the exhaust pressure as a function of the pressure in the intake manifold 20, is expressed as follows:

$$P_{exh}=[g(T_c)*MAP-hh(N)*k(AMP)*l(T_{exh})]/ll(T_{ech}) \tag{k}$$

In this case, no additional calibration is required for the determination of the exhaust pressure. The calibration is already carried out in the software, and can be re-used because of the reversibility of the model which is used.

It should be noted that there is a difference between the exhaust pressure and the intake pressure. In a four-stroke engine, two revolutions of the crankshaft are required before the pressurized air MAP in the intake manifold 20 is again present in the exhaust manifold 22 at the pressure $P_{exh}$. When the engine is running at constant speed, this difference clearly has no effect. In transient conditions, however, this difference must be taken into account, particularly when there are large variations in these pressures. Clearly, this difference becomes relevant when the value of MAP is calculated as a function of $P_{exh}$, but not when the pressure $P_{exh}$ is calculated as a function of MAP. This is because, when the exhaust pressure is determined by calculation on the basis of the pressure in the intake manifold 20, it is simply necessary to take into account the time difference which is a function of the engine speed N.

A first strategy for taking this difference into account, described here by way of example and without restrictive intent, consists in calculating an integrator of the value of MAP based, on the one hand, on the initial value of this pressure when the engine is stopped, and, on the other hand, on the difference between the air flow at the throttle valve 18 and in the cylinder 4. At constant speed, which can be determined for example by observing the gradient of variation of the angular position of the throttle valve 18, the value of the pressure MAP in the intake manifold 20 is determined as a function of the exhaust pressure.

Another strategy consists in initially calculating the pressure MAP as a function of the exhaust pressure $P_{exh}$. This calculated value of the pressure MAP is then reinjected into the air flow control system, and a variation is then found in transient conditions. To take the difference into account, the slope corresponding to this variation is increased.

The proposed method for calculating $P_{exh}$ or MAP can also be used to determine the ambient pressure. This is because, as may be noted, when the throttle valve 18 remains closed for a predetermined time interval, in other words when its opening is less than a predetermined value during this time interval, it is observed that:

$$P_{exh}-AMP=\phi(N) \tag{l}$$

where $\phi$ is a function which can be determined for each engine.

The above description thus shows that it is possible to envisage the determination of the air flow into the cylinders, and also the ambient pressure, in a turbocharged engine, on the basis of a knowledge of the exhaust pressure. It is thus possible to envisage the replacement, in an engine, of a sensor for determining the air supply pressure of the cylinders by means of a pressure sensor in the exhaust manifold. It is thus possible to provide two sensors. In this case, the second sensor is intended, for example, to monitor the first, or even to replace it in degraded mode. In the latter case, performance in the degraded mode will then be equal to that in the normal operating mode.

Furthermore, because of the reversibility of the described model, the exhaust pressure can be modeled without any additional calibration.

The present invention is not limited to the embodiment described above in the form of a non-restrictive example. It also relates to all other variant embodiments which may be produced by those skilled in the art within the context of the following claims.

The invention claimed is:

1. An air supply control method for a turbocharged engine having an intake manifold (20) downstream of a compressor of a turbocharger (14) and an exhaust manifold (22) upstream of a turbine of the turbocharger (14), comprising:

determining a mass air flow supplied to the engine and/or a pressure in the intake manifold (20), together with a temperature in the exhaust manifold, wherein a pressure in the exhaust manifold (22) is determined as a function of the pressure in the intake manifold (20), an engine speed, and temperatures in cylinders (4) and in the exhaust manifold (22), wherein a correction factor dependent on the ambient surrounding pressure is provided, and wherein the pressure in the exhaust manifold (22) $P_{exh}$ is calculated by a formula:

$$P_{exh}=[A(T_c)*MAP-B(N, AMP, T_{exh})]/C(T_{exh}),$$

where A, B and C are predetermined functions, $T_c$ is the temperature in the cylinders, MAP is the pressure in the intake manifold, N is the engine speed, AMP is the ambient pressure and $T_{exh}$ is the temperature of burnt gases in the exhaust manifold.

2. The control method as claimed in claim 1, wherein the air flow supplied to the engine is regulated by a throttle valve (18), and in that, when this throttle valve (18) is near its closed position within predetermined limits during a specified time interval, an ambient external pressure AMP is calculated on a basis of the exhaust pressure as a function of the engine speed.

3. An air supply control method for a turbocharged engine having an intake manifold (20) downstream of a compressor of a turbocharger (14) and an exhaust manifold (22) upstream of a turbine of the turbocharger (14), comprising:

determining a mass air flow supplied to an engine and/or a pressure in an intake manifold (20), together with a temperature in the exhaust manifold (22), wherein a pressure in the exhaust manifold (22) is measured by a sensor, and in that the pressure in the intake manifold (20) is determined on the basis of an exhaust pressure measured as a function of an engine speed and temperatures in the cylinders (4) and in the exhaust manifold (22), wherein a correction factor dependent on the ambient surrounding pressure is provided, and wherein the pressure in the intake manifold MAP is calculated by a formula:

$$MAP = [F(N, T_{exh}) * P_{exh} + G(N, AMP, T_{exh})] / [H(N, T_c)],$$

where F, G and H are predetermined functions, $T_c$ is the temperature in the cylinders, $P_{exh}$ is the pressure in the exhaust manifold, N is the engine speed, AMP is the ambient pressure and $T_{exh}$ is the temperature of burnt gases in the exhaust manifold.

4. The control method as claimed in claim 1, wherein the temperature in the exhaust manifold (22) is determined on the basis of modeling.

5. The control method as claimed in claim 1, wherein the air flow supplied to the engine is regulated by a throttle valve (18), and in that, when this throttle valve (18) is near its closed position within predetermined limits during a specified time interval, an ambient external pressure AMP is calculated on a basis of the exhaust pressure as a function of the engine speed.

6. The control method as claimed in claim 1, wherein the air flow supplied to the engine is regulated by a throttle valve (18), and in that, when this throttle valve (18) is near its closed position within predetermined limits during a specified time interval, the ambient external pressure AMP is calculated on a basis of the exhaust pressure as a function of the engine speed.

7. The control method as claimed in claim 1, wherein an air intake (10) and a mass air flow meter (12) are upstream of the turbocharger (14).

8. The control method as claimed in claim 1, wherein an intercooler (16) is downstream of the turbocharger (14).

9. The control method as claimed in claim 3, wherein an air intake (10) and a mass air flow meter (12) are upstream of the turbocharger (14).

10. The control method as claimed in claim 3, wherein an intercooler (16) is downstream of the turbocharger (14).

11. The control method as claimed in claim 1, wherein the air flow supplied to the engine is regulated by a mechanically or electrically controlled throttle valve (18), and when the throttle valve (18) is electrically controlled, an angle of opening of the throttle valve and opening of a turbocharger discharge valve (14) are controlled simultaneously.

12. The control method as claimed in claim 3, wherein the air flow supplied to the engine is regulated by a mechanically or electrically controlled throttle valve (18), and when the throttle valve (18) is electrically controlled, an angle of opening of the throttle valve and opening of a turbocharger discharge valve (14) are controlled simultaneously.

13. The control method as claimed in claim 1, wherein a correlation between a measured value and the determined pressure in the exhaust manifold (22) is greater than 0.9.

14. The control method as claimed in claim 3, wherein a correlation between a measured value and the determined pressure in the intake manifold (20) is greater than 0.9.

* * * * *